United States Patent Office
3,501,412
Patented Mar. 17, 1970

3,501,412
METHOD OF PREPARING DYSPROSIUM-ACTIVATED RARE-EARTH METAL VANADATE PHOSPHOR
Richard C. Ropp, North Caldwell, N.J., assignor to Westinghouse Electric Corporation, Pittsburgh, Pa., a corporation of Pennsylvania
Filed June 29, 1967, Ser. No. 650,098
Int. Cl. C09k 1/44
U.S. Cl. 252—301.4                                  6 Claims

ABSTRACT OF THE DISCLOSURE

To prepare improved dysprosium-activated yttrium vanadate, lanthanum vanadate, or gadolinium vanadate phosphor, particularly for use with discharge devices, dysprosium and the rare-earth metal matrix material are precipitated as oxalates in the relative proportions as desired in the phosphor. Vanadium oxide is added to the oxalate precipitate along with an alkali-metal chloride or bromide, or alkaline-earth metal chloride or bromide, which serves as a flux. This mixture is fired to form the phosphor and the flux then separated therefrom.

BACKGROUND OF THE INVENTION

This invention relates to particular phosphors which have use in discharge devices such as high-pressure mercury-vapor lamps and fluorescent lamps and, more particularly, to a method for producing improved dysprosium-activated rare-earth-metal vanadate phosphor compositions which have a very bright and efficient emission.

In Patent No. 3,152,085 is described a europium or dysprosium-activated, yttrium vanadate phosphor suitable for optical maser applications. Rare-earth acitvated lanthanium vanadate phosphors are disclosed by F. C. Pallila in the Journal of the Electrochemical Society, 112, 776 (1965). Dysprosium-activated rare-earth metal vanadate phosphor has a yellow emission and is well suited for use in mercury vapor discharge devices such as fluorescent lamps, except that the phosphor is not as bright as desired.

The easiest method to prepare a rare-earth metal vanadate phosphor is by solid-state reactions, such as are readily obtained by firing together the rare-earth oxide and vanadium pentoxide. It is also known to substitute the rare-earth oxalate in place of the oxide in preparing the raw mix prior to processing by firing. Such phosphors display a relatively poor degree of crystallinity and their particle sizes are much smaller than desired for use in conjunction with gas-discharge devices.

SUMMARY

It is the general object of this invention to provide a method for making dysprosium-activated yttrium vanadate, lanthanium vanadate, or gadolinium vanadate phosphor which is very efficient.

It is another object to provide a method for making dysprosium-activated rare-earth metal vanadate phosphor in order to induce the growth of particles of very high crystallinity in the phosphor to improve phosphor output.

It is a further object to provide a method for making dysprosium-activated rare-earth metal vanadate phosphor which has a particle size particularly adapted for use with discharge devices.

The foregoing objects of the invention, and other objects which will become apparent as the description proceeds, are achieved by providing a method for making dysprosium-activated rare-earth metal vanadate phosphor wherein there is first prepared a solution consisting essentially of predetermined amounts of yttrium-, lanthanium-, or gadolinium-containing compound and dysprosium-containing compound, with the relative gram-atom ratio of dysprosium to the other rare-earth metal being that ratio desired in the phosphor. The dysprosium and other rare-earth metal are co-precipitated from the solution as oxalates and the precipitate has mixed therewith a predetermined amount of vanadium oxide. The mixture is fluxed by adding thereto a small amount of alkali-metal bromide or chloride or alkaline-earth metal bromide or chloride, and the fluxed mixture is fired, preferably in an oxidizing atmosphere, in order to form the phosphor. Thereafter, the flux is separated from the formed phosphor.

BRIEF DESCRIPTION OF THE DRAWINGS

For a better understanding of the invention, reference should be made to the accompanying drawings wherein.

DESCRIPTION OF THE PREFERRED EMBODIMENTS

Figure 1:
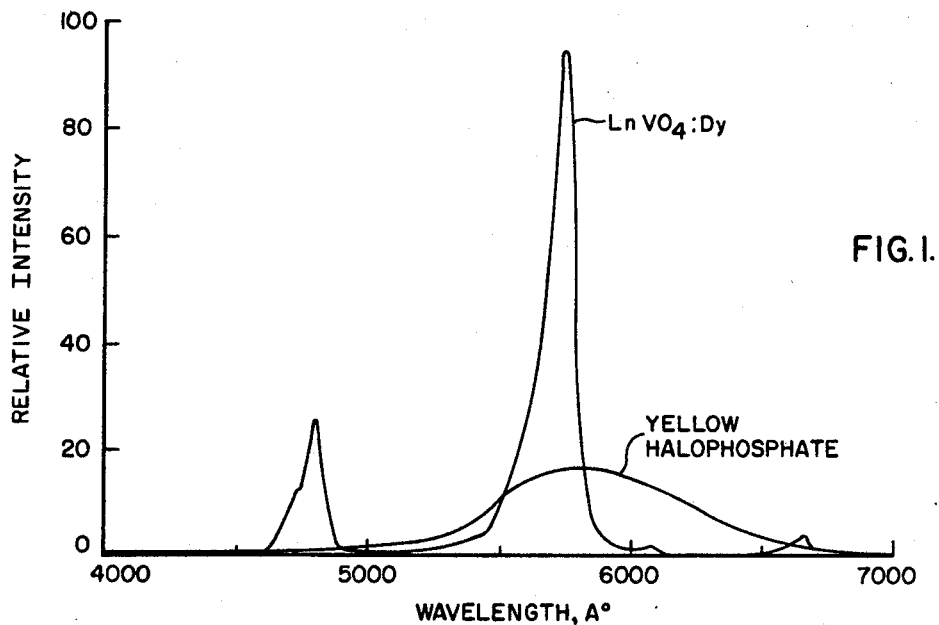
FIGURE 1 is a graph of relative intensity versus wavelength comparing the emission characteristics of the present phosphor with a so-called yellow halophosphate, as might be used in conjunction with fluorescent lamps.

The present phosphor can be expressed by the formula $Ln_x(VO_4)_y:Dy_z$, wherein when $x+z=1.00$, $y$ is from about 0.95 to 1.005 and $z$ is from 0.00125 to 0.00875. In this formula, "Ln" is one or more of yttrium, lanthanum, or gadolinium. As a specific example for preparing such a phosphor, 186.45 grams of dysprosium trioxide ($Dy_2O_3$) (99.9% pure) is dissolved in 225 ml. of concentrated $HNO_3$. This solution is diluted to 1.0 liter, 112.9 gms. $Y_2O_3$ (99.99% pure) are dissolved in 225 ml. concentrated $HNO_3$. This is diluted to 1.0 liter to form a 1.0 molar solution. For preparing the lanthanum vanadate phosphor, 162.9 grams $La_2O_3$ (99.99% pure) is dissolved in the nitric acid and then diluted to one liter, and for preparing the gadolinium vanadate phosphate, 181.25 grams $Gd_2O_3$ (99.99% pure) is dissolved in the nitric acid and then diluted to one liter to form the 1.0 molar solution.

For preparing the yttrium vanadate phosphor, 2.0 liters of the foregoing yttrium nitrate solution has added thereto 5.0 ml. of the dysprosium-containing solution. To this mixture is added 600 ml. of diethyl oxalate, both solutions being maintained at room temperature. The mixture is heated slowly while stirring, to a temperature of about 48° C., and it is held at this temperature for five minutes. Thereafter, the solution is heated to a temperature of approximately 75° C. and maintained at this temperature for two hours, during which time the rare-earth metal constituents of the solution will co-precipitate as oxalates. The precipitate is settled, separated, washed with distilled water by suspension and decantation and then dried. For preparing the lanthanum or gadolinium vanadate embodiments, the foregoing identical procedures are followed substituting the lanthanum-containing and gadolinium-containing solutions for the yttrium-containing solution.

The foregoing solutions consist essentially of predetermined amounts of the Ln-containing compound and dysprosium-containing compound wherein the relative gram-atom ratio of dysprosium to Ln in solution is that ratio desired in the phosphor. In the co-precipitation step as outlined hereinbefore, the Ln compound and the dysprosium are co-precipitated from the solution as oxalates. It should be understood, that the designation "Ln" refers to one or more of yttrium, lanthanium, of gadolinium and, pursuant to present practices, the designation Ln is generally used to refer to the rare earth or lanthanide series of metals. It should also be understood that the foregoing solutions can be mixed as desired in order to produce mixed yttrium-lanthanum-gadolinium vanadate phosphors in any proportions as desired. As a practical matter, when preparing the foregoing solutions the gram-atom ratio of dysprosium to Ln in the solution will vary from about 0.00125/0.99875 to 0.00875/0.99125. An oxalate method for co-precipitation of rare-earth metals is disclosed in copending application S.N. 474,102, filed July 22, 1965, and owned by the present assignee.

In the next step of preparation, 77.76 grams of the mixed co-precipitated oxalates (the assay is 43.62% oxides) is blended with 27.28 grams of vanadium pentoxide. The amount of vanadium oxide which is added is so selected that the metallic constituents of the mixed vanadium oxide, dysprosium oxalate and Ln oxalate are present in the mixture in the relative gram-atom proportions as are desired in the final phosphor. To the mixture is added approximately 10% by weight of a flux selected from one or more of lithium, potassium or sodium bromides or chlorides, or stontium, barium, calcium or magnesium chlorides or bromides. As a specific example, 10.63 grams of finely divided calcium chloride is blended with the mixture. The resulting mixture is fired from three to four hours at a temperature of approximately 1110° C. in air using open silica crucibles. After firing, the phosphor is allowed to cool and is thereafter milled with agate stones for approximately one hour. The resulting finely divided material is water washed to remove the flux by suspending the phosphor in distilled water, permitting the phosphor to settle and decanting the supernatant liquid. After drying, the resulting phosphor is very bright and is suitable for use in gas-discharge devices.

In explanation of the term flux, it has long been known that the use of a material which has a relatively low melting point and forms a liquid phase at relatively moderate temperatures, can cause recrystallization of the different material with which it is used without entering into the chemical reaction. Such a material is called a flux. When vanadates are prepared by solid-state reaction of the oxides, the use of the fluxes does not appear to promote crystal growth and normally, fluxed phosphor made by firing the oxalate, or compounds which decompose to form the oxides, together with vanadium oxide, are no more crystalline than those phosphors prepared by firing the oxides alone. In accordance with the present invention, the combination of the indicated alkali-metal halide or alkaline-earth metal halide flux together with the co-precipitated oxalates does have a marked effect on promoting crystallinity and enhancing particle growth in the phosphor.

In conducting the foregoing firing, the raw-mix constituents of the phosphor are fired at a predetermined temperature and for a predetermined time in order to form the phosphor and the firing temperature as used in preparing these phosphors are generally known. It should be pointed out that the firing temperature is not particularly critical an dthe firing time is not critical, but as a practical matter, the firing temperature is from 700° C. to 1400° C. with a firing time of at least two hours. The firing should be conducted in an atmosphere comprising oxygen, such as air, in order to control the valence of the activator, presumably plus three. The amount of the flux which is added to the mixed co-precipitated oxalates and vanadium oxide is not critical and can be varied over a wide range since the flux only promotes the reaction and does not enter into same. The indicated addition of flux is amount of 10% by weight of the phosphor raw-mix constituents has been found to be a convenient amount to be used.

After the phosphor is initially prepared, an additional small amount of the flux, such as 10% by weight, can be mixed therewith and the phosphor again fired for from three to four hours at a temperature about 1150° C., thereafter remilled, rewashed and dried as in the preceding example. The resulting phosphor is somewhat improved in crystallinity and the particle size is slightly larger than when a single firing step is utilized.

In order to prepare the gadolinium vanadate phosphor embodiment, the procedures as outlined for the yttrium vanadate embodiment are followed. When preparing the lanthanum vanadate phosphor embodiment, it is very desirable to utilize the double firing procedure as specified hereinbefore. This serves to stabilize the phosphor against any subsequent hydrolysis during exposure to atmospheric moisture.

The foregoing phosphors after single firing have an average particle size of about 8.5 microns and the double firing procedure will result in increasing the average particle size to about 10.5 microns. All of the phosphor embodiments of the present invention have a yellow line emission which is very similar in appearance to the eye to that of a yellow halophosphate. In FIG. 1 there is shown the spectral emission of the phosphors of the present invention as compared to a yellow halophosphate which has a conventional band emission.

Figure 2:
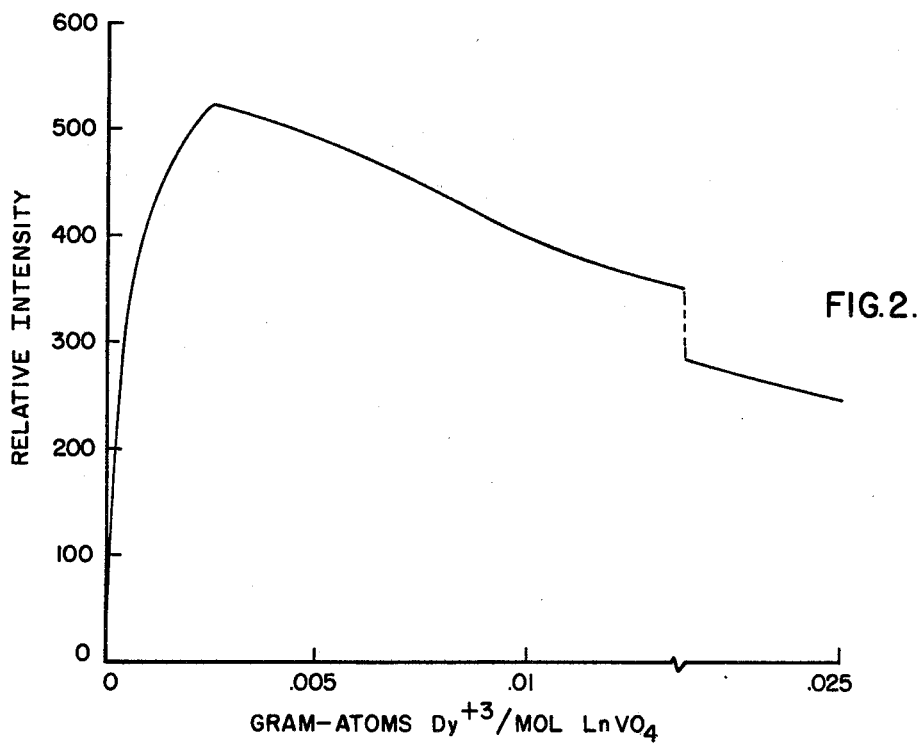
FIG. 2 is a graph of relative emission intensity versus gram-atoms of dysprosium in the phosphor per gram hole of matrix, illustrating the effects on phosphor brightness with varying activator concentration.

The effect of varying the activator concentration is shown in FIG. 2. This activator concentration is readily controlled by the relative amount of activator metal which is incorporated into the raw mix. Preferably, the relative gram-atom ratio of dysprosium to Ln is from 0.00125/0.99875 to 0.00875/9.99125 and for optimum performance, the activator should be present in such amount that the gram-atom ratio of dysprosium to Ln is about 0.0025/0.9975.

As an alternative mode for preparing the phosphor, any suitable pure vanadium oxide can be used and mixed with the co-precipitated oxalates, although vanadium pentoxide is preferred.

In copending application Ser. No. 650,097, filed concurrently herewith, by the inventor herein and assigned to the same assignee of the present invention, is disclosed europium-activated lanthanum vanadate phosphor which is prepared by firing first in sodium vanadate flux and thereafter firing in an alkaline-earth metal halide flux. In the case of the phosphor of the present invention, however, an initial firing in a sodium vanadate flux impairs the performance of the phosphor as compared to that performance which is obtained with the alkali metal halide or alkaline-earth metal halide flux.

It will be recognized that the objects of the invention have been achieved by providing an improved method for producing dysprosium-activated yttrium vanadate, lanthanum vanadate or gadolinium vanadate phosphor which is particularly adapted for use in conjunction with discharge devices, and which phosphor has a very high degree of crystallinity and a bright yellow emission.

I claim as my invention:

1. The method of making dysprosium-activated rare-earth metal vanadate phosphor of the general formulation $Ln_x(VO_4)_y:Dy_z$, wherein Ln is one or more of yttrium, lanthanum or gadolinium, and when $x$ plus $z$ is unity, $y$ is from about 0.95 to 1.005 and $z$ is from 0.00125 to 0.00875, which method comprises:

(a) preparing a solution consisting essentially of predetermined amounts of Ln-containing compound and dysprosium-containing compound wherein the relative gram-atom ratio of dysprosium to Ln in the solution is that ratio desired in said phosphor;

(b) co-precipitating said Ln and said dysprosium from said solution as oxalates;

(c) separating said precipitate and forming a mixture by mixing with said separated precipitate a predetermined amount of vanadium oxide, with the total amounts of vanadium oxide, Ln oxalate and dysprosium oxalate in said mixture being such that the metallic constituents thereof are present in the relative gram-atom proportions as desired in said phosphor, and also including in said mixture a small amount of flux of at least one of lithium, potassium or sodium bromides or chlorides, or strontium, barium, calcium or magnesium chlorides or bromides;

(d) firing said mixture at a predetermined temperature and for a predetermined time sufficient to form said phosphor; and (e) separating said flux from the formed phosphor.

2. The method as specified in claim 1, wherein after said phosphor is initially prepared, an additional small amount of said flux is mixed therewith, said mixed phosphor and flux are refired at a predetermined temperature and for a predetermined time to improve the crystallinity of said phosphor, and thereafter said flux is separated from said refired phosphor.

3. The method as specified in claim 1, wherein the relative gram-atom ratio of dysprosium to Ln in the initially prepared solution is from 0.00125/0.99875 to 0.00875/0.99125, said vanadium oxide is added as the pentoxide to said co-precipitated oxalates in such amount that the ratio of gram-atoms of vanadium to total Ln plus dysprosium is from 0.95/1 to 1.005/1, said mixture is fired in an atmosphere comprising oxygen at a temperature of from 700° C. to 1400° C. for at least two hours, and said flux is dissolved from said phosphor after firing.

4. The method as specified in claim 3, wherein said firing atmosphere is an air atmosphere, said flux is added in amount of about 10% by weight of said mixture, and said flux is separated from said phosphor after firing by dissolving said flux in an aqueous solvent.

5. The method as specified in claim 3, wherein the relative gram-atom ratio of dysprosium to Ln in the initially prepared solution is about 0.0025/0.9975, and said mixture is fired in an air atmosphere at a temperature of about 1100° C. for three to four hours.

6. The method as specified in claim 5, wherein after said phosphor is initially prepared, about 10% by weight of said flux is mixed therewith, said phosphor and said flux are refired in an air atmosphere at a temperature of about 1150° C. for about three to four hours, and said flux is thereafter separated from said phosphor by water washing.

References Cited

UNITED STATES PATENTS

| | | | |
|---|---|---|---|
| 2,921,912 | 1/1960 | Rimbach. | |
| 3,152,085 | 10/1964 | Ballman et al. | 252—301.4 |
| 3,322,682 | 5/1967 | Thompson | 252—301.4 |
| 3,368,980 | 2/1968 | Avella | 252—301.4 |
| 3,416,019 | 12/1968 | Kaduk. | |

FOREIGN PATENTS 779,860  3/1968  Canada.

HELEN M. McCARTHY, Primary Examiner

R. D. EDMONDS, Assistant Examiner